(12) United States Patent
Casier et al.

(10) Patent No.: US 6,556,069 B1
(45) Date of Patent: Apr. 29, 2003

(54) VOLTAGE GENERATING CIRCUIT

(75) Inventors: Herman Joris Casier, Kuurne (BE); Benny Graindourze, Wilsele (BE); Denis Dupeyron, Brussels (BE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/640,651

(22) Filed: Aug. 18, 2000

(30) Foreign Application Priority Data

Aug. 26, 1999 (EP) .............................. 99402133

(51) Int. Cl.[7] .............................. G05F 1/10; G05F 3/02
(52) U.S. Cl. ....................................... 327/540; 327/536
(58) Field of Search .............................. 327/536, 537, 327/538, 540, 541, 543

(56) References Cited

U.S. PATENT DOCUMENTS

| 4,876,462 A | * 10/1989 | Kobatake et al. ............ 327/536 |
| 5,513,091 A | 4/1996 | Uchida et al. ................. 363/60 |
| 5,530,640 A | 6/1996 | Hara et al. ..................... 363/60 |
| 6,064,594 A | * 5/2000 | Calafato et al. ............. 327/589 |

* cited by examiner

*Primary Examiner*—Terry D. Cunningham
*Assistant Examiner*—Quan Tra
(74) *Attorney, Agent, or Firm*—Sughrue Mion, PLLC

(57) ABSTRACT

The invention relates to a voltage generating circuit having:
a voltage input (1);
voltage boosting means (2), having an input (3) and an output (4);
means (6) for varying the voltage supply level of the input to the said boosting means (2) from the said voltage input of the circuit, capable, on one hand, in a first state, of permitting the application, at the input to the said boosting means (2), of a fraction, that is possibly limited, of the voltage input to the circuit and, in a second state, of increasing the level of voltage applied to the said input to the boosting means (2) and, on the other hand, of permitting the change-over from the said first to the said second state according to a triggering signal, obtained by feedback of the output voltage from the said boosting means (2) to the said means (6) for varying the voltage level, so as to optimize the production at the output from the said boosting means (2) of a desired voltage level.

22 Claims, 1 Drawing Sheet

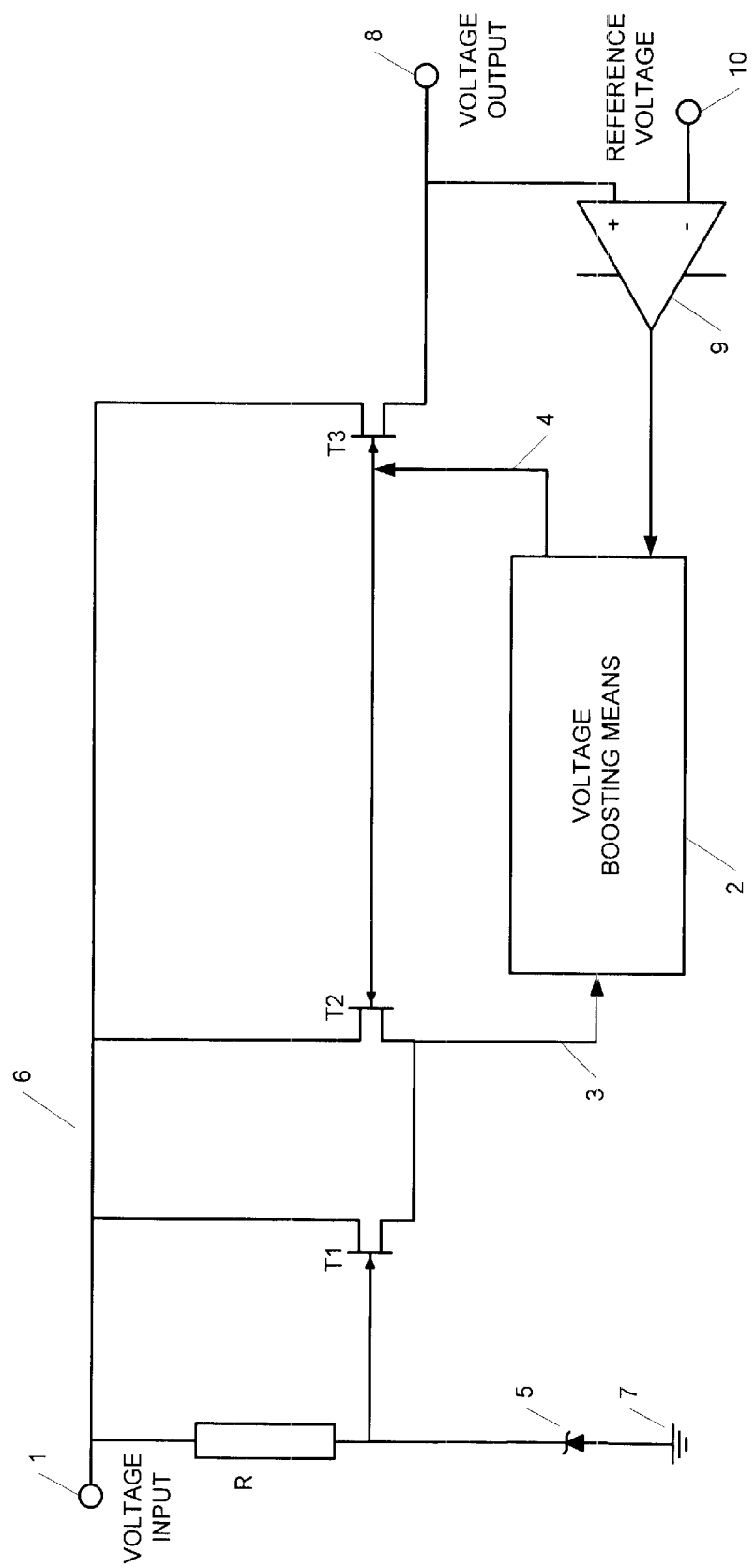

VOLTAGE GENERATING CIRCUIT

BACKGROUND OF THE INVENTION

The invention relates to a voltage generating circuit and to a voltage stabilized supply device including such a circuit.

At the present time, numerous voltage generating circuits are known. One of the problems that they have to solve is that of outputting a voltage level that is relatively stable or, at the very least, one that does not exceed a given maximum value, while the voltage level input to the circuit can vary, either above or below a nominal supply voltage.

To solve this problem, it has already been suggested to use components such as Zener diodes shunt connected at the input to the circuit in order to limit the voltage to a given level, in the event of the nominal voltage being exceeded. Furthermore, in order to protect the components present downstream, only a fraction of the voltage input to the circuit is used to generate the output voltage.

It will be appreciated, nonetheless that, with such a solution, the means used to achieve the desired output voltage level have to be over-dimensioned in relation to the means that it would have sufficed to use if all of the input voltage, and not just a fraction thereof, had been used. In the case of charge pump circuits, for example, it is necessary to increase the number of charge stages of the pump or pumps.

As a corollary, in circuits having the same characteristics, the response times to obtain the same output voltage level are longer for a circuit using only a fraction of the input voltage and not its totality. This will apply, in particular, to charge pump circuits having the same number of charge stages but using, or not using, all of the circuit input voltage.

SUMMARY OF THE INVENTION

The object of the present invention is to provide a voltage generating circuit and a voltage stabilized supply device including such a circuit that overcome the aforementioned drawbacks and that make it possible to avoid having to over-dimension the means used to obtain at the output the desired voltage level, that is to say, for example, that make it possible to reduce the number of charge stages of the charge pumps, in the event of such components being used.

A further object of the present invention is to provide a voltage generating circuit and a voltage stabilized supply device using such a circuit that make it possible to reduce the start-up times.

Another object of the present invention is to provide a voltage generating circuit and a stabilized voltage supply device including such a circuit that afford protection in the event of a voltage level exceeding the nominal voltage being present at the input.

Further objects and advantages of the invention will emerge in the course of the following description, which is given only by way of illustration and is not intended to limit same.

The invention relates firstly to a voltage generating circuit having:
  a voltage input;
  voltage boosting means, having an input and an output;
  means for varying the voltage supply level of the input to the said boosting means from the said voltage input of the circuit, capable, on one hand, in a first state, of permitting the application, at the input to the said boosting means, of a fraction, that is possibly limited, of the voltage input to the circuit and, in a second state, of increasing the level of voltage applied to the said input to the boosting means and, on the other hand, of permitting the change-over from the said first to the said second state according to a triggering signal, obtained by feedback of the output voltage from the said boosting means to the said means for varying the voltage level, so as to optimize the production at the output from the said voltage boosting means of the desired voltage level.

The invention also relates to a voltage stabilized supply device including such a circuit.

BRIEF DESCRIPTION OF THE DRAWINGS

The invention will be more readily understood in the light of the following description of an embodiment taken in conjunction with the accompanying drawing wherein: the FIGURE is a diagram showing an exemplary form of embodiment of the voltage generating circuit according to the invention, including ;an exemplary embodiment of the voltage stabilized supply device.

DETAILED DESCRIPTION OF THE INVENTION

As illustrated in the figure, the voltage generating device according to the invention has a voltage input, 1, and voltage boosting means, 2, having an input, 3, and an output, 4, which could be the output from the circuit.

In order to optimize the production, at the output from the said voltage boosting means 2, of a desired voltage level, the circuit according to the invention further has means, 6, for varying the level of voltage supply to input 3 of the said boosting means 2, from the said voltage input 1 of the circuit.

The said means 6 for varying the supply level are designed to be capable, in a first state, of permitting the application, at the input to the said boosting means 2, of a fraction, that is possibly limited, of the voltage input to the circuit.

<<Possibly limited>> is to be taken as meaning, as explained in more detail hereinafter, that, in the event of a voltage exceeding the nominal voltage being present at the input to the circuit, the voltage applied downstream is then fixed at a chosen maximum level.

The said means 6 for varying the voltage supply level are further designed to be capable, in a second state, of increasing the level of voltage applied to the said input of boosting means 2.

In addition, they permit the change-over from the said first to the said second state, this being in accordance with a triggering signal, obtained by feedback of the output voltage from the said boosting means 2 to the said means 6 for varying the voltage level.

There is thus provided a circuit that will, firstly, afford protection for the said voltage boosting means 2 and/or the downstream components. Furthermore, the said circuit makes it possible, thanks to the change-over from the said first to the said second state, no longer to use just a given fraction of the said input voltage but a higher voltage, possibly approaching the said input voltage. For the same dimensioning of boosting means 2, it is then possible to obtain shorter response times.

It should also be noted that, thanks to the feedback, it is the output signal of boosting means 2 themselves that is used to improve the level of their input signal, which thus makes it possible to benefit from positive feedback.

The circuit according to the invention thus makes it possible, without prejudice to performance, to be able to contemplate voltage generation protected from overvoltages at the input. It will include more precisely for this purpose voltage limiting means, at this point R, 5.

As illustrated, the said means 6 for varying the voltage supply level of the input to the said boosting means 2 are constituted, for example, by two transistors, T1, T2, whereof the drain and source are connected, respectively, to the input 1 of the circuit and to the input 3 of boosting means 2, and the gate of which, in the case of the first thereof, T1, is connected to the said means for limiting the voltage at the input to the generator and, in the case of the second thereof, T2, to output 4 of the said boosting means 2.

The said transistors T1 T2, are, in particular, high voltage active devices.

The operation of such a circuit is described hereafter. For a nominal voltage input to the circuit, the input voltage of voltage boosting means 2 is initially equal to the input voltage of the circuit less the voltage between the gate and the source of transistor T1.

Voltage boosting means 2 then perform their function, and the voltage at the gate of second transistor T2 rises above the voltage at the gate of first transistor T1. The said second transistor T2 consequently becomes more conductive and the latter takes over the said transistor T1, while permitting the application at the input to the said voltage boosting means 2 of practically the entire input voltage of the circuit.

When the input voltage of the circuit far exceeds the nominal voltage, the voltage input to boosting means 2 is, initially, equal to the voltage supplied by limiting means R, 5 less the voltage between the gate and the source of first transistor T1.

As in the preceding case, boosting means 2 then perform their function. The input voltage of voltage boosting means 2 becomes equal to that of built-in limiting means 8, 9, 10 and 2 minus the voltage between the gate and the source of second transistor T2 if this voltage is higher than the initial input voltage.

Thus, in the event of a nominal voltage being present at the input to the device, the said first and second transistors T1, T2 operate in linear mode, while, in the event of a voltage far higher than nominal voltage, they operate in saturated mode.

The said limiting means are constituted, in particular, by a component with three connections, the first connection being designed to be connected to the voltage to be limited, the second connection being designed to be connected to a lower supply voltage, e.g. the earth, and the third being designed to supply a given limited voltage, through the choice of the said component.

These can be, for example, a resistor R and a Zener diode 5 connected in series. The resistance is connected between the voltage input and the gate of the first transistor, T1. The Zener diode is connected between the gate of the first transistor T1 and the lowest supply voltage, e.g. the earthed point 7. The said diode is connected so as to block an input voltage of the circuit corresponding to the input voltage of the device, which is positive. The means could also consist of a depletion mode MOS transistor.

The said boosting means 2 are constituted, for example, by a charge pump, that is to say a component constituted, among others, by capacitors and/or diodes or other switching means, disposed in successive stages.

They thus have a level of amplification of the given voltage, possibly variable as a function of the number of stages used.

The invention also relates to a voltage stabilized supply device including a circuit as described above.

There can be a third transistor, T3, the drain of which is connected to the said voltage input 1 of the circuit and the gate of which is connected to the output 4 of the said voltage boosting means 2.

Thanks to the action of the voltage boosting means 2, the said third transistor T3 can then be considered as completely conductive, as from the moment at which the voltage at its gate is sufficiently high.

There is thus supplied at the source of the said third transistor T3 an output voltage of device 8 that is substantially equal to the said voltage input to the circuit or to the said maximum voltage, hence regulated.

Furthermore, as already mentioned, the said boosting means 2 can have a variable voltage amplifying level, and means 9 for adjusting the said level according to the output voltage of the said device can be provided if necessary.

These can be, for example, a component making it possible to compare the output voltage of the said device with a reference voltage 10 and, in the event of the latter being exceeded, to control the operation of the charge pump, for example its sequencing.

The output voltage of the latter then drops, thus permitting a reduction in the level of the output voltage of the device to the extent of dropping back beneath the said reference voltage.

It should be noted that the terminology used (<<source>>, <<drain>>, <<gate>>) in designating the connections of the first, second and third transistors, T1, T2, T3, makes no presupposition regarding the type concerned. These can, in fact, be, for example, transistors of the MOS type, in particular DMOS type transistors in the event of a risk, in particular, of a high input voltage. They can also, however, be, among others, bipolar or IGBT transistors.

Other forms of embodiment of the invention, within the grasp of a man of the art, could, of course, have been contemplated without thereby departing from the scope of the invention, in particular as regards the mode of regulation of the output voltage about the reference voltage.

What is claimed is:

1. A voltage generating circuit comprising:

a voltage input;

voltage boosting means having an input and an output;

means for varying the voltage level at the input to said boosting means, said means for varying having a first state that applies a fraction of a voltage at said voltage input to the input of said boosting means and a second state that increases the level of voltage applied to the input of said boosting means, and on the other hand, permitting the change-over from said first state to the said second state according to a triggering signal obtained by feedback of an output voltage from said boosting means to said means for varying the voltage level; and means for limiting the voltage range that is input into said means for varying the voltage level, wherein said voltage range is less than or equal to a predetermined maximum range that is independent of the voltage at said voltage input, and said means for limiting the voltage range connected to said voltage input.

2. The voltage generating circuit according to claim 1, said means for varying comprises first and second transistor means, wherein a drain terminal of each transistor means is connected to said voltage input, and a source terminal of each transistor is connected to the input of said boosting means, and a gate terminal of said first transistor means is connected to said means for limiting and a gate terminal of said second transistor means is connected to the output of said boosting means.

3. The voltage generating circuit according to claim 2, wherein said transistor means are active devices operating at a relatively high voltage.

4. The voltage generating circuit according to claim 1, wherein said limiting means comprises a component having three terminals, the first terminal being connected to said voltage input, the second terminal being connected to a predetermined low supply voltage, and the third terminal outputting a predetermined voltage based on the choice of said component.

5. The voltage generating circuit according to claim 1, wherein said boosting means comprise a charge pump.

6. The voltage generating circuit according to claim 1, further comprising:
   an input voltage terminal connected to said voltage input; and
   an output voltage terminal.

7. The voltage generating circuit according to claim 6, further comprising a third transistor means wherein a drain terminal of third transistor means is connected to said voltage input and a gate terminal of third transistor means is connected to the output of said voltage boosting means so as to supply an output voltage at a source terminal of said third transistor means that is substantially equal to the voltage at said input voltage terminal or to a maximum voltage of said boosting means, said output voltage terminal being connected to said source terminal of said third transistor.

8. The voltage generating circuit according to claim 7, wherein said boosting means has a variable voltage amplification level, said voltage stabilized device further comprising means for adjusting the voltage amplification level according to the output voltage of said voltage stabilized device.

9. The voltage generating circuit according to claim 4, said component comprising:
   a resistive element connected between said first and said third terminals; and
   a zener diode connected between said second and said third terminals.

10. The voltage generating circuit according to claim 2, wherein said first and second transistor means are selected from a group comprising MOS transistors, DMOS transistors, bipolar transistors and IGBT transistors.

11. The voltage generating circuit according to claim 7, wherein said third transistor means is selected from a group comprising MOS transistors, DMOS transistors, bipolar transistors and IGBT transistors.

12. A voltage generating circuit, comprising:
   a voltage input;
   a voltage boosting circuit having an input and an output;
   a variable voltage circuit connected to the input of said voltage boosting circuit, said variable voltage circuit having a first state that applies a fraction of the voltage at said voltage input to the input of said voltage boosting circuit, and having a second state that increases the level of voltage applied to the input of said voltage boosting circuit, and said variable voltage circuit being capable of switching from the first state to the second state according to a triggering signal obtained by feedback of an output voltage from said voltage boosting circuit to said variable voltage circuit; and
   a voltage limiting circuit connected to said variable voltage circuit, said voltage limiting circuit limiting the voltage range input to said variable voltage circuit, wherein said voltage range is less than or equal to a predetermined maximum voltage that is independent of the voltage at said voltage input.

13. The voltage generating circuit according to claim 12, said variable voltage circuit comprising first and second transistors, wherein a drain terminal of each transistor is connected to said voltage input, and a source terminal of each transistor is connected to the input of said voltage boosting circuit, respectively, and a gate terminal of said first transistor is connected to the voltage limiting circuit and a gate terminal of said second transistor is connected to the output of said voltage boosting circuit.

14. The voltage generating circuit according to claim 13, wherein said first and second transistors are active devices operating at a relatively high voltage.

15. The voltage generating circuit according to claim 12, wherein said voltage limiting circuit comprises a component having three terminals, the first terminal being connected to said voltage input, the second terminal being connected to a predetermined low supply voltage, and the third terminal outputting a predetermined voltage based on the choice of said component.

16. The voltage generating circuit according to claim 15, said component comprising:
   a resistive element connected between said first and said third terminals; and
   a zener diode connected between said second and said third terminals.

17. The voltage generating circuit according to claim 12, wherein, said voltage boosting circuit comprises a charge pump.

18. A voltage generating circuit according to claim 12, further comprising:
   an input voltage terminal connected to said voltage input; and
   an output voltage terminal.

19. The voltage generating circuit according to claim 18, further comprising a third transistor, wherein a drain terminal of said third transistor is connected to said voltage input terminal and a gate terminal of said third transistor is connected to the output of said voltage boosting circuit so as to supply an output voltage at a source terminal of said third transistor that is substantially equal to the voltage at said input voltage terminal to a maximum voltage of said voltage boosting circuit, said output voltage terminal being connected to said source terminal of said third transistor.

20. The voltage generating circuit according to claim 19, wherein said voltage boosting circuit has a variable voltage amplification level, said voltage stabilized device further comprising an amplifier for adjusting the voltage amplification level according to the output voltage of said voltage stabilized device.

21. The voltage generating circuit according to claim 13, wherein said first and second transistors are selected, from a group comprising MOS transistors, DMOS transistors, bipolar transistors and IGBT transistors.

22. The voltage generating circuit according to claim 19, wherein said third transistor is selected from a group comprising MOS transistors, DMOS transistors, bipolar transistors and IGBT transistors.

* * * * *